US005196248A

United States Patent [19]

Danico et al.

[11] Patent Number: 5,196,248

[45] Date of Patent: Mar. 23, 1993

[54] TILE DESIGNS AND METHODS OF MAKING TILE DESIGNS

[76] Inventors: Richard Danico; Kathleen Danico, both of 620 Palm Dr., Satellite Beach, Fla. 32937

[21] Appl. No.: 453,699

[22] Filed: Dec. 20, 1989

Related U.S. Application Data

[62] Division of Ser. No. 128,723, Dec. 4, 1987, Pat. No. 4,889,572.

[51] Int. Cl.[5] .......................... B32B 3/10; F04F 13/08

[52] U.S. Cl. ........................................ 428/46; 428/47; 428/49; 428/51; 428/137; 428/138; 428/141; 428/542.2; 428/913.3; 52/389; 52/390; 52/391

[58] Field of Search ................. 428/131, 137, 45, 138, 428/139, 80, 42, 49, 51, 33, 44, 13, 46, 47, 38, 140, 304.4, 317.1, 344, 350, 352, 354, 141, 188, 172, 203, 542.2, 913, 913.3; 156/63; 52/309.3, 389, 309.4, 390, 391

[56] References Cited

U.S. PATENT DOCUMENTS 1,278,270 10/1918 Wilber ................................ 428/139
4,567,704 2/1986 Bernett ................................ 428/49
4,681,786 7/1987 Brown ................................. 428/49
4,832,995 5/1989 McLauchlin .......................... 428/49
4,971,644 11/1990 Mahn ................................. 428/139

FOREIGN PATENT DOCUMENTS 2076188 10/1971 France ................................ 428/49
1149002 4/1969 United Kingdom ................. 428/49

*Primary Examiner*—Donald J. Loney

[57] ABSTRACT

Artistic tile designs are mass produced with precut tile pieces from commercially available square tile units. An initial tile design is created with the tile pieces to serve as a pattern. Thereafter the tile designs are reproduced by placing a transparent, semi-transparent or translucent sheet-type substrate or backing over the initial design, and by securing matching tile pieces to the substrate, as viewed through the substrate. The substrate is of the type that is sufficiently rigid to substantially maintain its shape while handled. The tile design can be repeated on the reverse side of the substrate using the design on the front side as the pattern to provide a double-sided design. If an opaque substrate is to be used, the front faces of the tile pieces are temporarily secured to a readily removable substrate, and the adhesive is thereafter applied to the back of the tile pieces to be permanently mounted. Further, the tile design can create a mold, and the tile design can be recreated with the use of the mold. The adhesive used is flexible to minimize stress due to substrate flex and temperature changes. Added strength for the bond is provided by allowing the adhesive to flow through holes in the substrate while maintaining its flexibility.

5 Claims, 10 Drawing Sheets

TILE DESIGNS AND METHODS OF MAKING TILE DESIGNS

This is a divisional of copending application Ser. No. 07/128,723 filed on Dec. 4, 1989, now U.S. Pat. No. 4,889,972.

FIELD OF INVENTION

This invention pertains to tile designs in general, and more particularly to a method of mass producing tile designs.

BACKGROUND OF INVENTION

Tiles for long periods of time have been used to produce art works. Tiles designs have also been used for decorating structures. When producing art works, the various pieces of tile were selected according to color and shape and individually cemented in place to produce the item, person, or scene being created. This approach is very expensive, time consuming, and requires a substantial amount of creative ability. On the other hand, when tile designs are used to provide an abstract type of decorative effect, wherein the color and shape of the tile pieces are selected to provide an overall effect, such as normally found in bathrooms, kitchens and swimming pools, such tile designs are created by combination of square tile units that are manufactured by mass production techniques so that they can be purchased relatively inexpensively for every day use. Such abstract tile designs generally use square tile units that include the individual tile pieces secured to a flexible screen-type of backing. The square tile units are usually formed of a plurality of multi- or single-colored tile pieces individually mounted to the screen, with spaces therebetween. This allows the square tile units to be permanently mounted on a surface by means of cement or grout. The square tile units are initially positioned in place and urged into wet cement or grout, and in the case of vertically inclined surfaces, at times also secured to the surface by nails. Then additional cement or grout is placed over the entire surface of the abutting tile units so that the cement or grout is allowed to fill the spaces between individual tile pieces. The surface is then wiped to allow the polished front faces of the tile pieces to extend beyond the cement or grout coating, while the cement or grout secures the entire tile units and the individual tile pieces in place.

These commercially mass produced square tile units are usually formed with the individual tile pieces secured to the flexible screen backing in the form of standard one foot squares. Such tile units can be obtained with the tile pieces forming the design being of the same color and shape, or can have a variety of colors and a variety of shapes and sizes. The size of the individual tile pieces can be as small as one-eighth of an inch to as large as three inches. In the case of ceramic tile, the exterior or front face, and part of the side edges, of the individual tile pieces can include a wide variety of colors and shades, including changing colors and shades within a single tile piece. The tile pieces also have highly polished surfaces that further enhance their attractiveness. The reverse or back side of the tile pieces usually has a rough unfinished, uncolored, gray surface. This allows the tile pieces to be adhered to the screen, and later to the cement or grout when permanently mounted in place. The tile pieces are also made so that side edges of the tile pieces adjacent to the front surface and the side surfaces are slightly rounded. This allows the tile units to be mounted in place with some of the cement or grout removed in the spaces between the tile pieces, and still project the colored effect of the edges of the tile pieces.

These high volume, commercially available tile units are created to be highly repetitive in design, wherein large volumes of these tile units can be purchased at relatively low costs and wherein each of such square tile units are essentially identical to each other. Of course, depending upon each individual run by the manufacturer, the tile units of a single design may vary somewhat in color from one run to the other. Such ceramic tile designs have an added advantage in that their surfaces are fired during manufacture to provide a very hard and water-resistant front surfaces. Hence these square tile units can be mounted, side by side, to form decorative shower and bathroom walls, swimming pool surfaces, and at times floors, without fear that the colors and designs will change significantly with time. The individual surfaces of the ceramic tile pieces are essentially waterproof and will not noticeably fade in color, even if exposed to the sun's direct rays. Hence, such ceramic tile units form an ideal means of decorating indoor and outdoor surfaces.

As previously mentioned, these tile units usually take the form of one foot square units so that these tile units can be mounted in place adjacent to each other and abutting each other to cover a wall, floor or pool surface to provide the desired decorative effect. If an additional design is to be included within the tiled surface, the additional tile design unit had to be created in a square or rectangular form, preferably in a multiple of the square tile units size, so that the amount of cutting of the additional tile design unit would be minimized. If the additional tile design unit was to have a non-standard or irregular shape, the individual square tile units forming the background would need to be cut to fit the irregular shape of the added tile design. This procedure is highly time consuming and very expensive. Of course, another approach would be to leave an open space and allow the tile designer to individually create the additional tile design to fit the open space. Again this creative approach is also very time consuming and expensive.

In a similar fashion as mentioned above with regard to the foot square tiles, individual, irregularly-shaped tile designs have been provided for pools and walls with the commercially tile pieces secured to the flexible type screening material. With this type of tile design, just in the case of the square foot tiles, the tile designs are required to be secured in place by the use of cement or grout. These types of tile designs are mounted in the pool at the time the pool is being installed so hat the cement conforms with the rest of the pool floor. When mounting on existing cement wall, the entire wall, or a substantial portion thereof, would need to be coated with cement to conform the cement used to mount the tile design with the rest of the wall.

Hence, as can be seen, the specialized designs of tile in the past had to be either created and cemented in place at the location, or else crated elsewhere on the flexible backing and shipped to the location to be mounted and then cemented in place. In the latter situation, if the tile designs were required to fit within an allotted space in a surface previously decorated with square tile units, such specialized tile design units were required to be square or rectangular in its overall shape to fit within the shape of the open space. Hence, in order to conform with the square or rectangular shape, such specialized tile designs were created with individually shaped parts and pieces, a large number of which were individually manufactured for each particular design. If a new design was to be created, the differently-shaped tiles of the desired color and shape were needed to be especially manufactured. Hence, in the past, the manufacturer of such tile designs required tile piece manufacturing capability, or required the ability to order individually shaped and colored tile pieces from manufacturers. In order to manufacture such specialized tile designs at a reasonable cost, these specialized tile pieces are required to be manufactured in large volumes. Hence, there is a limited number of designs that can be made available without undergoing large costs in inventory. It is understood that tile designs can be created in low volume using tile pieces produced by home hobbiest-type of ceramic tile manufacturing techniques, however, these tile pieces do not have the strength and color retention characteristics of the commercially manufactured tiles and therefore are of limited use, particularly if they are to be used outdoors.

OBJECTS OF THE INVENTION

It is, therefore, an object of this invention to provide a new and improved method of making tile designs.

It is also an object of this invention to provide a new and improved method of making tile designs using pieces of commercially available tile pieces.

It is a further object of this invention to provide new and improved tile designs that can be of any overall shape and configuration and can be readily mounted and conform with the background setting.

It is also an object of this invention to provide a new and improved method of manufacturing artistic tile design on a mass production basis.

It is still a further object of this invention to provide a new and improved method of installing mass produced artistic tile designs.

SUMMARY OF THE INVENTION

In accordance with the invention, new and improved tile designs and methods of making the same, includes the creation of a tile design that is to serve as a pattern. In accordance with a first embodiment of the invention, a transparent or translucent substrate is placed over the tile design pattern and the tile design is reproduced on the substrate. As a further feature of the invention, the substrate can be reversed and a duplicate tile design can be created on the other side of the substrate, providing a double sided design.

As a still further feature of the invention, the individual tile pieces used to form the tile design pattern and later used to reproduce the tile designs, may be obtained from commercially available square tile units, generally formed with a plurality of a variety of individual tile pieces secured to flexible screen backing. These commercially available tile pieces come in a variety of colors and shapes and have the advantage of being formed by a fired-type of ceramic manufacturing process making such tile pieces impervious to weather elements, uneffected by water, and not susceptible to color fading.

In accordance with another embodiment of the invention, in the event a tile design is to be created on a non-transparent or transparent substrate, or be created on a substrate already mounted in place, the tile design is created from the tile design pattern; however, with a temporary, readily removable backing or substrate secured to the front face of the tile design pieces. Thereafter when mounting, an adhesive is applied to the back face of the tile pieces and the tile design is mounted to the permanent substrate and the temporary substrate is removed. The temporary substrate can, for example, be paper, screening, a sheet of plastic with a soluble adhesive allowing the temporary substrate to be removed when the tile design is permanently secured. Alternately, the temporary substrate can be a foam-type of substrate formed by applying foam to the front faces of tile pieces or by placing the tile design face down into the unhardened foam in a manner so that the tile pieces will not permanently stick to the foam substrate. Just as in the case of the other temporary substrate, adhesive is applied to the back sides of the tile pieces and the foam substrate removed when the tile design is permanently secured. The foam substrate has the added advantage in that if made sufficiently rigid, it can be used as a mold for creating future design pieces.

DETAILED DESCRIPTION OF THE INVENTION

The process of manufacturing tile designs in accordance with the invention starts with selection of a design to be produced with individual tile pieces. The design can be, for example, a pre-existing design in any form, i.e., drawing, painting, photograph, or, for example, can be a newly created design. In the case of the newly created design, or the existing design, an outline of the design can be created in a flat sheet of paper 14 or canvas, such as the sketch 10 of the pelican 12 illustrated in FIG. 1. In the case of an existing design the outline can be modified or scaled to be greater or smaller than an existing design. The sketch 10 of the pelican 12 of FIG. 1, in the present example, was selected to be thirty-eight inches high and thirty inches wide. However, the size and shape of the design can be of any range depending on whether the design is a bird, flower, fish, lobster, etc., and depending upon whether the tile design is to be mounted indoors or outdoors.

Figure 2:
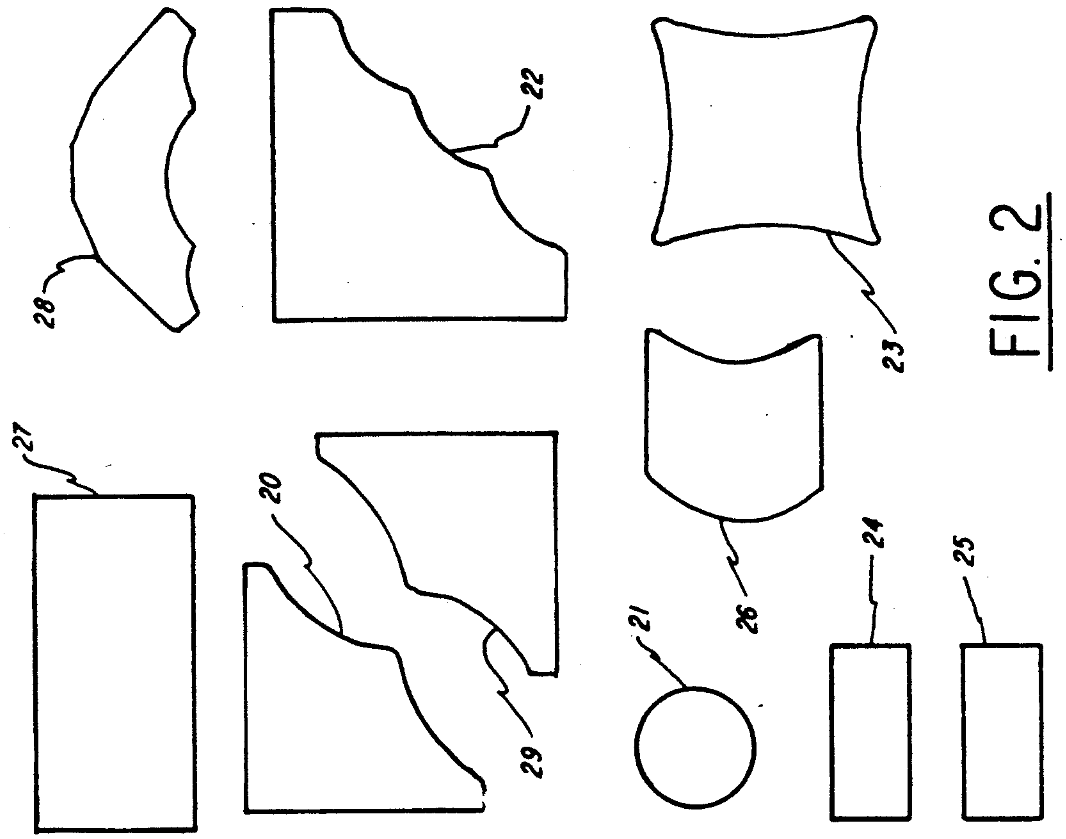
FIG. 2 includes an illustration of the plurality of commercially available tile pieces to be used to create a tile design.
Figure 3:
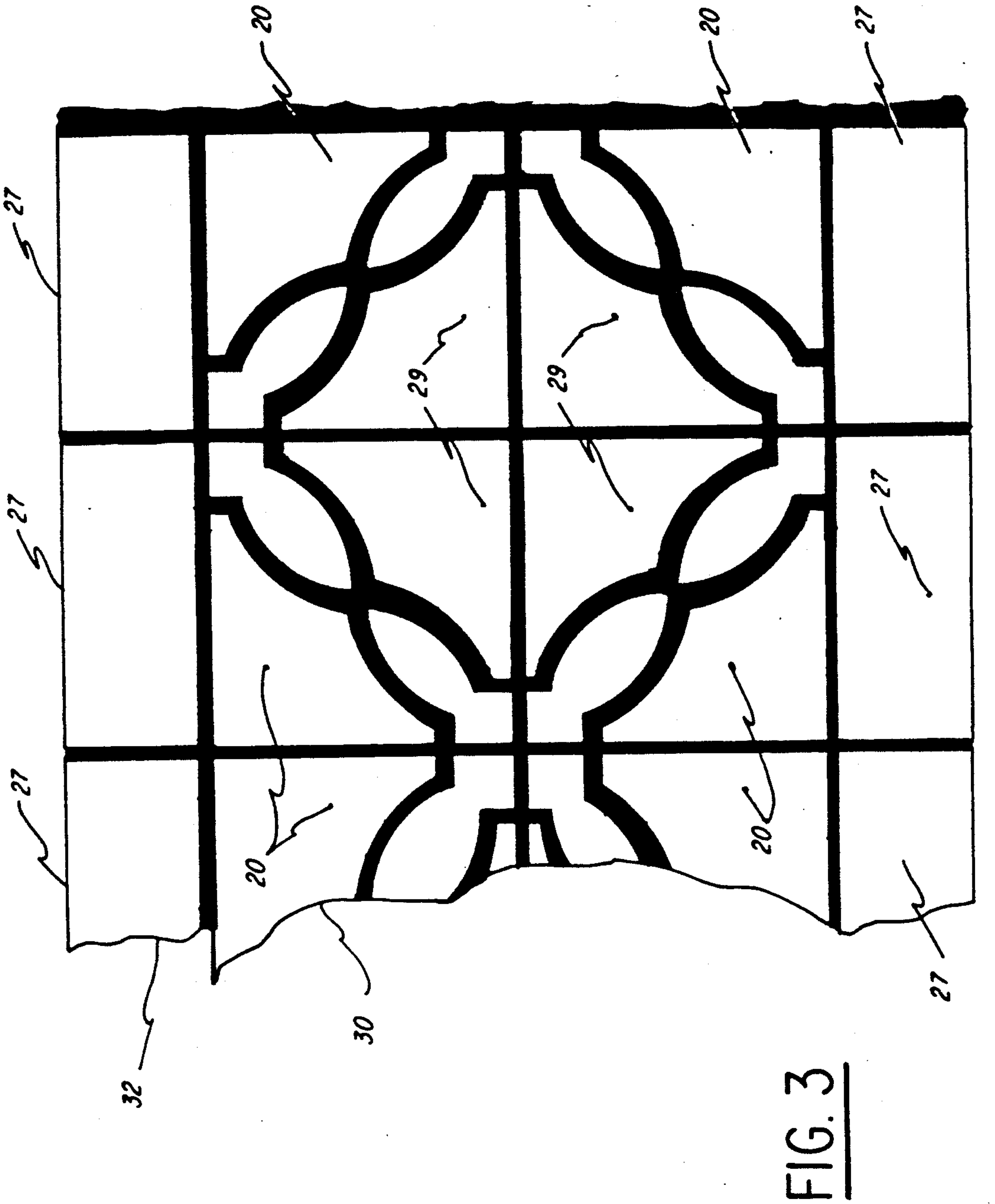
FIG. 3 illustrates a commercially available square tile unit that includes a plurality of ceramic tile pieces attached to a flexible screen-type backing.

Once the outline 10 of the design has been selected, then the shapes and colors of the individual tile pieces are to be selected to create the overall tile design. A number of different commercially available square foot tile units, having individual tile pieces mounted on flexible substrates such as screening or paper 32, are collected, as illustrated by the square tile unit 30 of FIG. 3. The specific square tile units are selected for the individual shapes and colors of the individual tile pieces therein that can be used to create the tile design from the sketch 10 of the pelican 12 of FIG. 1. It is not unusual that as many as ten different square foo\ tile units 30 are needed to provide individual tile pieces for any one tile design. The selected square tile design units 30 are then placed in water so that the individual tile pieces can be removed from the flexible screen backing 32 and sorted in accordance with their color and shape. FIG. 2 illustrates ten separate tile pieces 20-29 selected from several commercially available square tile units to be used to form the pelican design 12 from the sketch 10 of FIG. 1. Although only a few pieces from each square tile unit are selected to create the pelican tile design, the surplus tile pieces, after sorting, are saved and used for other tile designs so as to minimize waste. As illustrated in the present example, three tile pieces 20, 27 and 29, have been selected to create the pelican tile design from the square tile unit 30 illustrated in FIG. 3.

The commercially available precut tile pieces 20-29 of FIG. 2 have a variety of shapes and colors. In the present case of the tile design for the pelican 12, tile pieces 29 are glossy dark brown, tile pieces 20 are gray with brown specs, tile pieces 22 are medium brown, tile piece 21 is red, tile pieces 24 are dark brown, tile pieces 25 are light brown, tile pieces 23 are glossy light and dark brown, tile pieces 27 are glossy dark brown, tile pieces 26 are glossy dark dark brown, and tile piece 28 is light brown with dark brown spots. These tile pieces can be selected from tile units available from a wide variety of manufacturers.

Figure 8:
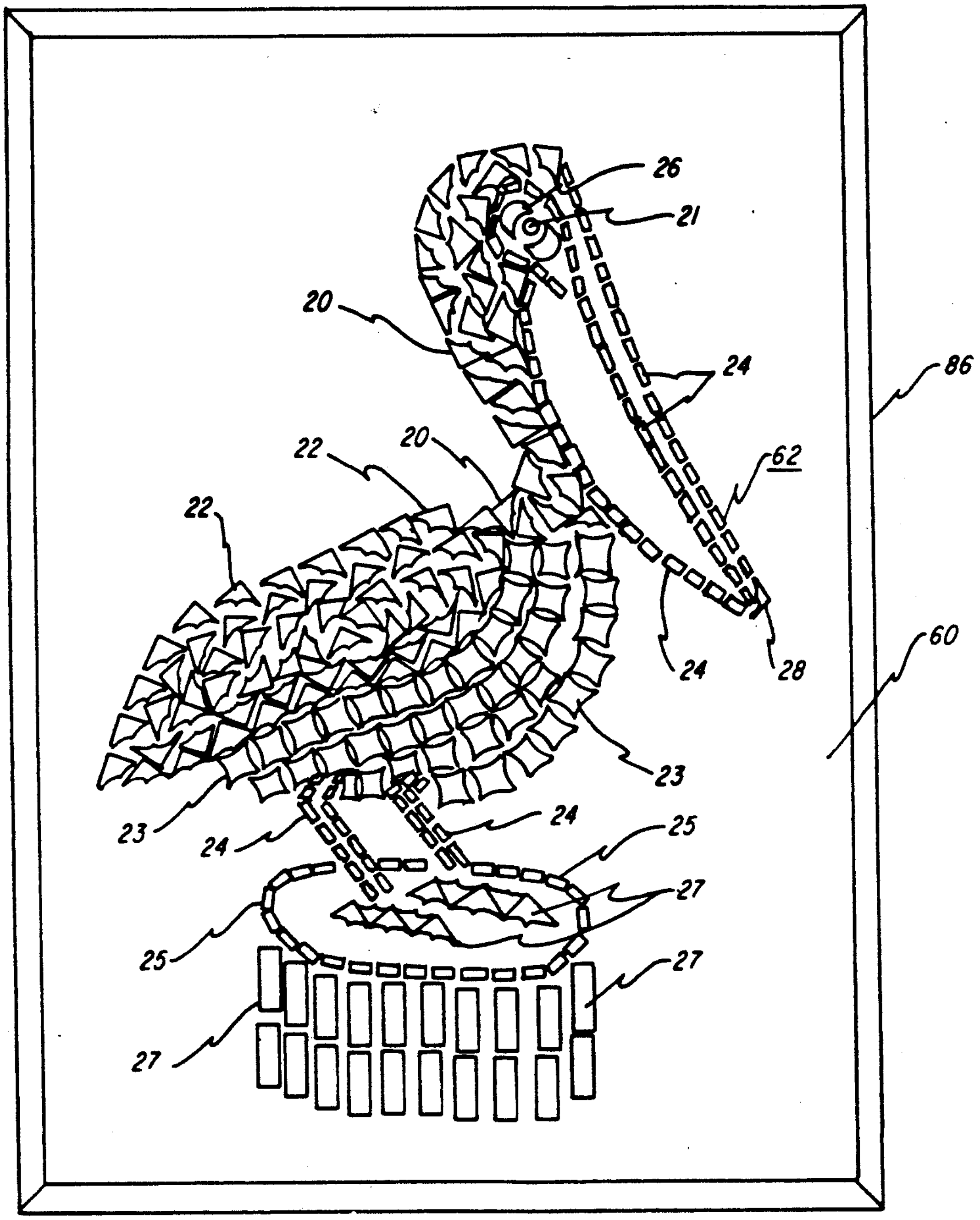
FIG. 8 illustrates a front view of a tile design mounted on a substrate, made in accordance with the invention, and including a frame.

Further, as will be shown, the following numbers of pieces of tiles 20-29, of the type illustrated in FIG. 2, were used to create the final production tile design of the pelican 80 of FIG. 8, i.e., 27 pieces of tile piece 20, 1 piece of tile piece 21, 56 pieces of tile piece 22, 39 pieces of tile piece 23, 80 pieces of tile piece 24, 25 pieces of tile piece 25, 2 pieces of tile piece 26, 20 pieces of tile piece 27, 1 piece of tile piece 28, and 10 pieces of tile piece 29. All these selected pieces of tiles 20-29 are commercially manufactured with specific shapes and have colored surfaces that are fired in manufacture to be of sufficient hardness and impervious to water so they are capable of being located essentially in most any environment, indoors and outdoors, without damage to surface and without the fading of color.

Figure 1:
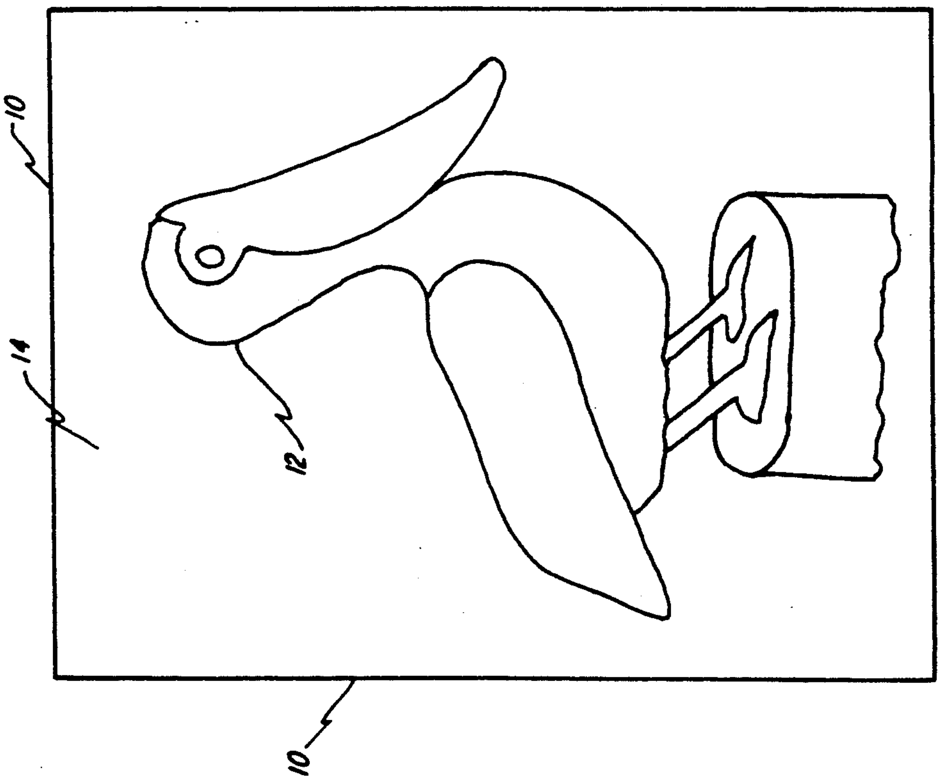
FIG. 1 includes the sketch of an outline of a design to be created with tile pieces.
Figure 4:
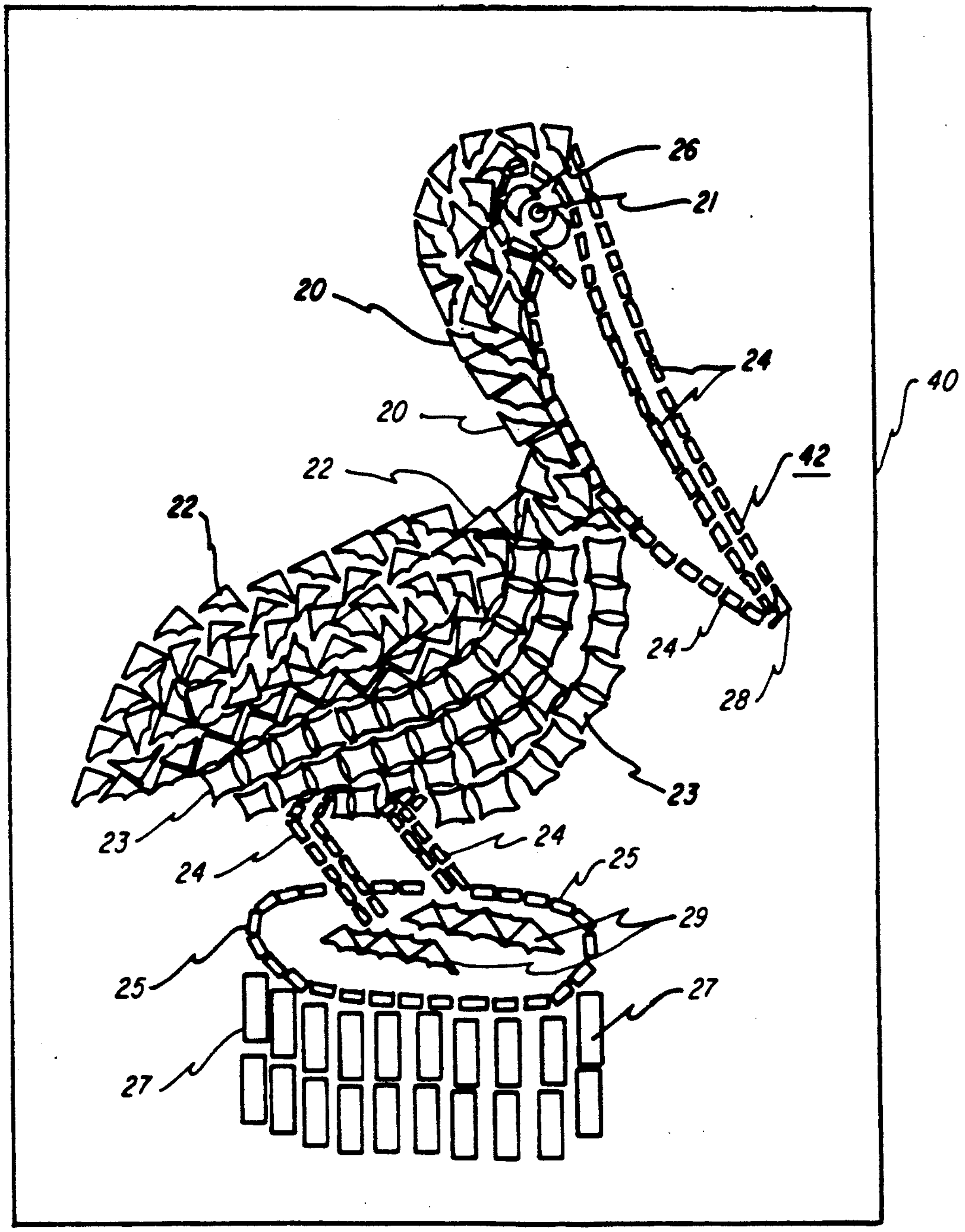
FIG. 4 illustrates a tile design to be used as a pattern, secured to a substrate.
Figure 5:
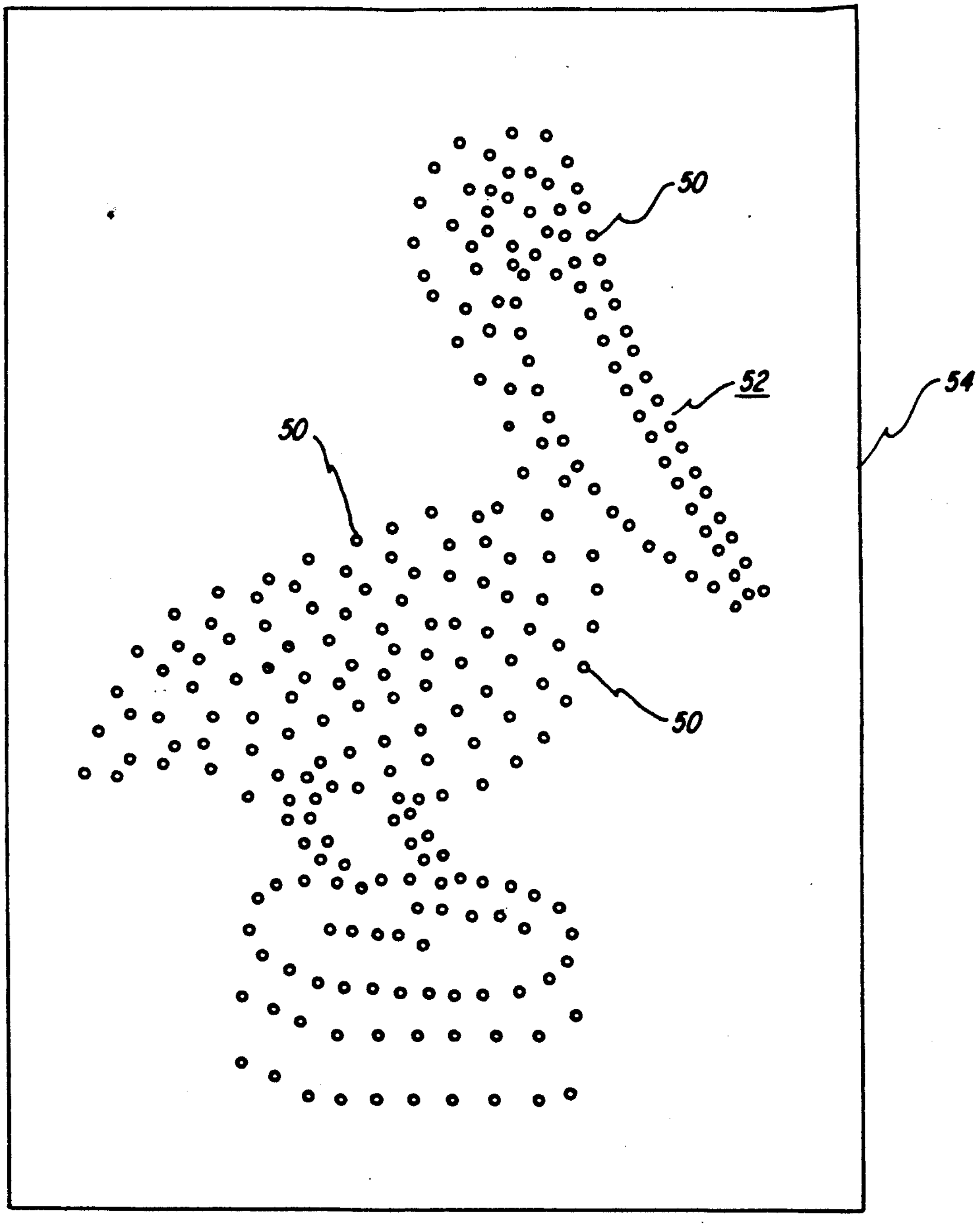
FIG. 5 illustrates a sheet substrate material having a plurality of holes drilled therethrough, one for each tile piece in the tile design of FIG. 4.

The pieces of tiles 20-29 are now secured to a substrate following the outline of the sketch 12 of FIG. 1 in a manner to create the pelican design 42 of FIG. 4 that is to serve as a pattern for the manufacture of additional production pelican tile designs. A sheet of transparent, semi-transparent or translucent material or substrate 40 is placed over sketch 10 of the pelican 12 of FIG. 1 and the tile pieces 20-29 secured to the substrate to provide the tile design 42 pattern. A flexible screening can be used as the substrate 40 for the pattern in that flexible screening has the advantage in that the tile design pattern 42 can be folded for ease of storage. Such a tile design on a flexible screen backing is the same as the prior art tile design units and can be mounted by cementing permanently in place, as previously described. If storage is no problem, a transparent, semi-transparent or translucent sheet of plastic can be used as the substrate. It should be understood that the term transparent, semi-transparent or translucent substrate, as used herein, means any backing material through which there is sufficient visibility therethrough so that when placed over the sketch 12, or when placed over a tile design pattern 42, the sketch 12 or tile design pattern 42 is sufficiently visible therethrough to enable the various steps to be carried out in producing or reproducing tile design.

In accordance with one embodiment of the invention, once the tile design pattern 42 has been created, production tile designs can now be mass produced on a variety of transparent, semi-transparent or translucent, commercially available sheet-type substrates, such for example as glass, plexiglass or Lexan (a trademark of General Electric Company), depending upon the environment and the use that the specific tile design is to be employed. For example, if a tile design is to be mounted outdoors without any frame, where it will be exposed to the various elements, or where it will be mounted adjacent to a hot tub, or on a shower wall, a Lexan-type substrate is preferred. A Lexan substrate is extremely flexible, yet rugged, and does not discolor by exposure to the sun. The Lexan material is not affected by water from a sprinkling system that may have a high sulphur or salt content. Hence, the Lexan substrate has the advantage of being used in a wide variety of environments without serious detrimental effects in its appearance, flexibility or strength. On the other hand, if the tile design is to be used primarily indoors, or where specially colored background or surface effects are desired, a less expensive plexiglass can be used as a substitute. In special situations the tile design can be mounted on glass, but, of course, special care in handling will be required for such tile designs.

Figure 6:
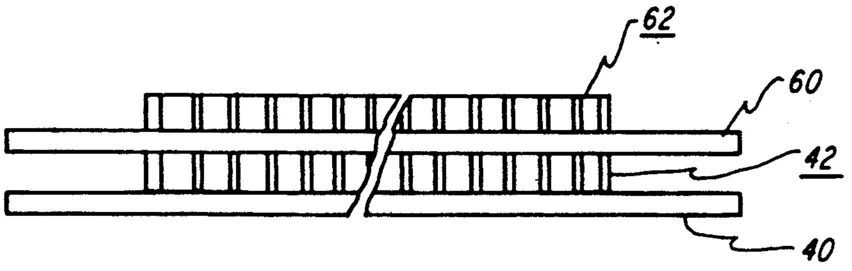
FIG. 6 illustrates a side view of the various components involved in a first embodiment of a method of making tile designs on a transparent or translucent substrate in accordance with the invention.

In accordance with the invention, when the final tile design product 62 of FIG. 8 is to be mass produced, the selected transparent, semi-transparent or translucent production sheet substrate 60 such as plastic, plexiglass, Lexan or glass that has sufficient rigidity to maintain its shape when being handled (as contrasted to flexible screening) is placed over the tile design pattern 42 of FIG. 4 so that the tile design is visible therethrough, as illustrated in the side view of FIG. 6. In the case of Lexan, one sixteenth of an inch thickness was found to be sufficient. If using plexiglass, a thicker sheet would be preferred. The same tile pieces 20–29 in shape and color are now secured to the substrate 60 to match the design of the pattern 42. The manner in which the tile pieces 20–29 are secured to the substrate 60 will depend upon the manner in which the production tile design 62 is to be handled, and the environment is to be located. For example, if the tile design 62 is to be handled with care, or the tile design is to be framed, a dab of silicone glue, such as the General Electric Silicone 1200 adhesive, is applied to the back of each tile piece 20–29. The surface should be thoroughly cleaned prior to the mounting of the tile pieces. In the case of Lexan, the surface should be cleaned with alcohol thereafter care should be exercised not to touch the surface where the tile pieces are to be mounted. Further, in the case of Lexan or plexiglass substrate, where, due to the flexibility of the substrate a great deal of stress and strain will be applied to the securing agent when being handled, the surface of the substrate 60 just opposite, the tile pieces 20–29 can be roughened to provide a better bond. Alternately, the holes 50 can be drilled through the substrate 60 approximately in the center of the tile pieces 20–29 to allow the securing agent to extend through the holes 50 and expand on the other side of the substrate 60. This provides a button-type effect that provides greater strength in securing the tile pieces 20–29 to the substrate. If the silicone glue is used, the silicone glue is sufficiently flexible to allow the tile pieces 20–29 to move and adjust to the stress and strain when the substrate 60 is flexed. The silicon glue has the added advantage in that its flexibility provides a compensation factor for the differences in the coefficients of expansion of the tile pieces and the substrate, thereby reducing the likelihood that the tile pieces may come loose with changes in temperature.

Figure 7:
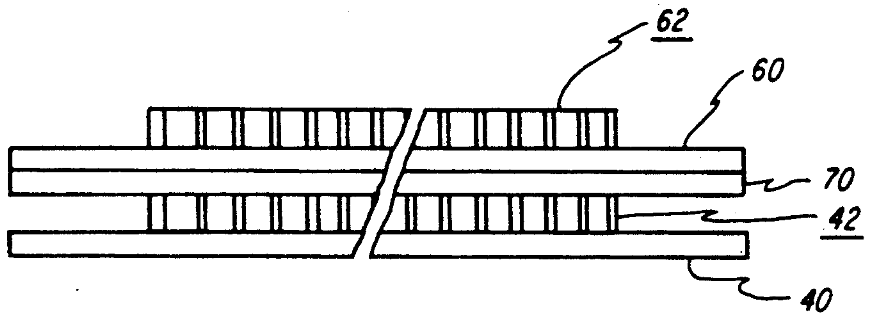
FIG. 7 illustrates a side view of the various components involved in a second embodiment of a method of making tile designs on a transparent or translucent substrate in accordance with the invention.

If the above-mentioned hole mounting procedure is to be used, a separate pattern 52 for the holes 50 is to be created. This can be done by placing a separate transparent, semi-transparent or translucent substrate 54 over the tile design pattern 42, and by drilling a hole in the substrate 54 for each tile piece. When a substrate 60 is selected for the manufacture of the next production tile design 62, the substrate 60 can be preformed with holes 50 by placing the substrate 54 with the drilled holes 50 over or under the production substrate 60, and holes drilled through the substrate 60 in accordance with the holes in the pattern substrate 54. Then the production substrate 60 can be placed over the tile design pattern 42 (FIG. 6) and the tile design 62 reproduced on the production substrate 60 as before, except the securing agent placed on the back of the tile pieces 20–29 is pushed through the corresponding holes 50 as the tile piece is urged against the production substrate 60 to force the securing agent through the hole 50 and spread against the back of the substrate 60. As mentioned before, with a silicone-type securing agent this arrangement provides a button-type effect creating a flexible bond with greater strength. A sheet of thin clear, 3 or 4 mil, plastic film 70 (FIG. 7) can be placed between the production substrate 60 and the tile design pattern 42 to prevent the securing agent from sticking to the tile design pattern 42. The plastic film 70 may be removed when the securing agent has sufficiently hardened to maintain the tile pieces in place on the substrate 60.

Figure 10:
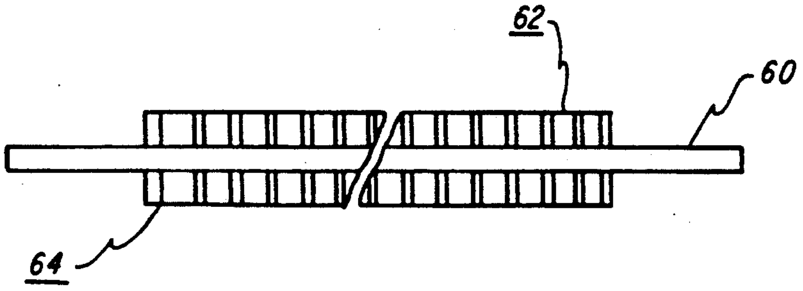
FIG. 10 includes a side view of the various components involved in a third embodiment of a method of making tile designs on a transparent or translucent substrate, in accordance with the invention, wherein the tile design is double sided.
Figure 9:
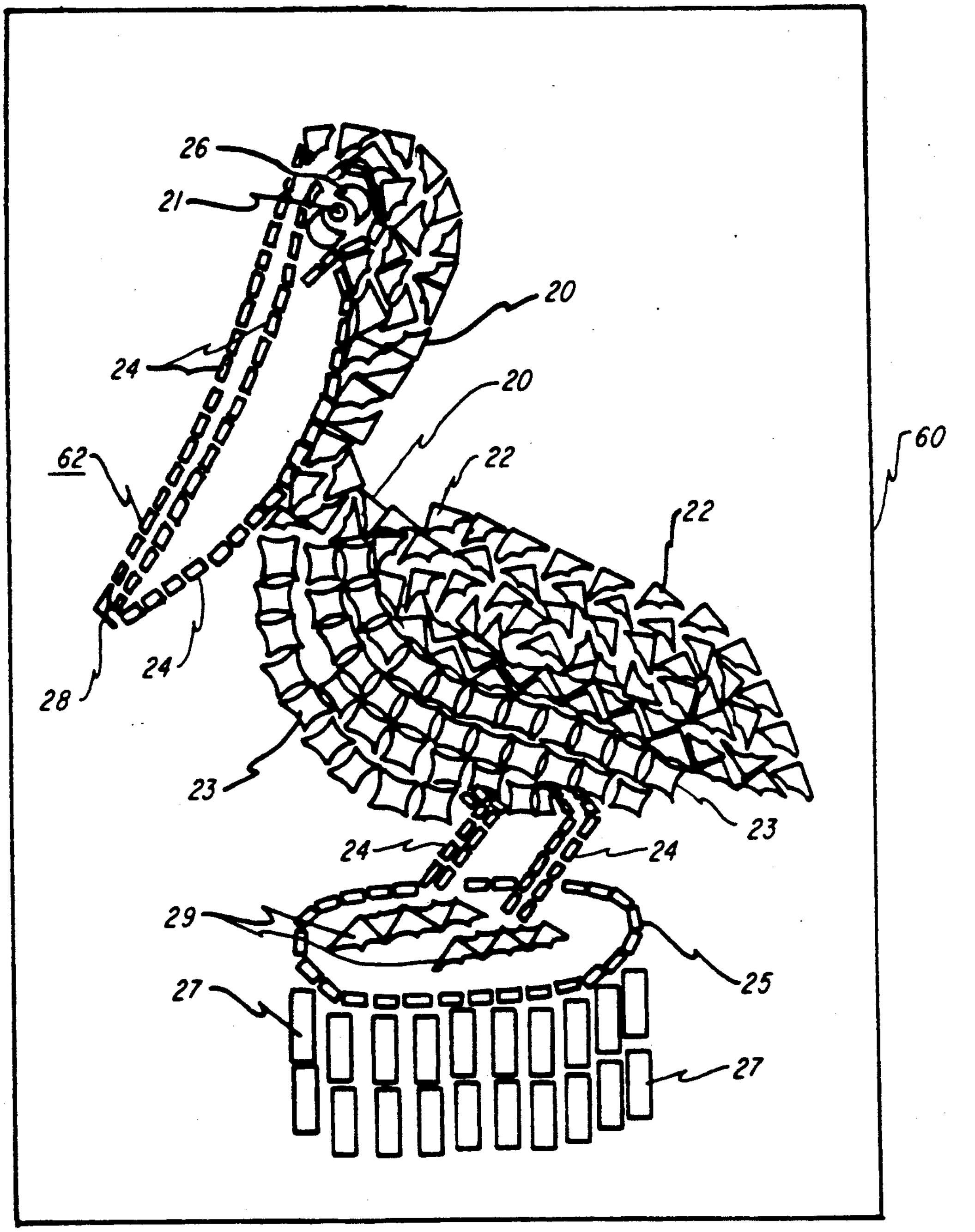
FIG. 9 includes a rear view of a tile design of FIG. 8 without the frame.

Although the production tile design 62 has been described as single sided design secured to one side of the substrate 60, it should be understood that the tile design can be made to be double sided. With the tile design 62 is secured to the production substrate 60, as previously described with regard to FIG. 1-8, since the back side of the tile pieces 20–29 is not colored and has an irregular or rough surface when viewed from the back of the transparent substrate 60, the tile design 62, as a whole, appears to be gray. To make a double-sided design takes an additional step of turning the substrate 60 over to have the back side exposed, as illustrated in FIG. 9, and securing like tile pieces 20–29 of the same shape and color, directly opposite the corresponding tile pieces on the tile design 62 to produce the reverse tile design 64 (FIG. 10). In addition, the tile design pattern 42 could be used as a visual aid if needed. Further, to aid the process of making double sided tile designs, the tile pieces 20–29 have been selected to have a symmetrical shape (as illustrated in FIG. 2) wherein the tile pieces can be reversed about an axis and essentially provide a mirror image. If unsymmetrical type tile pieces have been selected, care must be made so that the exterior edges of the tile pieces of both the front and back tile designs 62 and 64 tend to match as much as possible. The inner portion of the tile design may not be affected by the use of unsymmetrical tile pieces depending upon the colors of the tile pieces and the separation between the tile pieces used in creating the tile design. FIG. 10 illustrates an end view of the double-sided tile design with the first tile design 62 secured to one side of the substrate 60 and the second {and reverse) tile design 64 secured to the other side of the substrate 60.

As previously mentioned, it is important that the production substrate 60 be sufficiently transparent so that when the production substrate 60 is placed over the tile design pattern 42, the tile design pattern 42 be sufficiently visible therethrough to allow the tile design 62 to be duplicated on the production substrate 60 from the tile design pattern 42 with like tile pieces 20–29. For example, the production substrate 60 can be selected to be clearly transparent so that when the tile design 62 is mounted on a wall, fence, or other background, the background will be clearly visible through the substrate 60 and the tile design 62 will tend to have the appearance of having been formed directly on the background. If mounted on a tile background, the tile design 62 will have the effective appearance of being created as part of the tiled background.

Alternately, substrate 60 could also be a colored substrate, selected to match the background or room decorum and in addition or alternately could also include a colored backing or background design to provide special effects. It should be noted that since the tile design 62 is mounted on one side of the substrate 60, an additional design can be created on the back side wherein a three dimensional effect can be provided to the overall design. Further, the substrate 60 need not have a smooth surface but could, for example, be comprised of a sheet of plastic having a design formed on one or both surfaces. Such substrate 60 could be used, for example, with a double-sided tile design of FIG. 10 as a room divider. Furthermore, a picture frame 82 as illustrated in FIG. 8, can be secured to the edges of the substrate 60 to provide an added artistic effect and also provide a stiffening means to allow the tile design to be handled with less substrate flex and thereby exert less stress on the adhesive securing the tile pieces to the substrate.

In accordance with another embodiment of the invention, a tile design can be created on non transparent surfaces or substrate such as mirrors or walls, or on transparent or translucent surfaces that are premounted in place, such as windows or shower doors. The tile design pattern 42 will again be created on a substrate 40 as previously described above with regard to FIG. 1-4 using the commercially available tile pieces 20-29 of FIG. 2. According to FIG. 11, which illustrates an end view of the various components involved, a tile design 110 can be formed on the tile design pattern 42. Because of the uneven front face surfaces of tile pieces 20-29, a small amount of water soluble glue can be used to hold the tile pieces 20-29 of place temporarily on the tile design pattern 42 itself. A temporary substrate 112 is now secured to the front face of the tile pieces 20-29 in the tile design 110 so that the tile design 110 can be removed, as a whole, with the front faces of the tile pieces 20-29 continuing to be attached to the temporary substrate 112. The front face of tile design patterns 42 can now be cleaned and used for the manufacture of the next tile design.

If desired, an additional step can be included in the process of placing a thin film of clear plastic or flexible screening 114 over the tile design pattern 42. The front face of tile pieces 20-29 of the tile design 110 are now placed on the plastic film or screening 114 to match the tile design pattern 42, and secured to the film or screening 114 temporarily, if needed, by a water soluble glue. The temporary substrate 112 is now again secured to the front sides of the tile pieces 20-29 as previously mentioned, however in this case the plastic film or screening 114 can remain in place until just prior to the final step of mounting the title design 110 to a permanent substrate.

Instead of the plastic film or screening 114 mentioned above a sheet of clear and somewhat more rigid plastic could be used and placed over the tile design pattern 42 and the tile design 110 duplicated on the sheet plastic. This would remove the problem with the unevenness of the front faces of the tile pieces 20-29 and, therefore, there would be no need to temporarily glue such tiles in place. As described above, the substrate 112 will again be temporarily secured to the front faces of the tile pieces 20-29 of the tile design 110.

Figure 12:
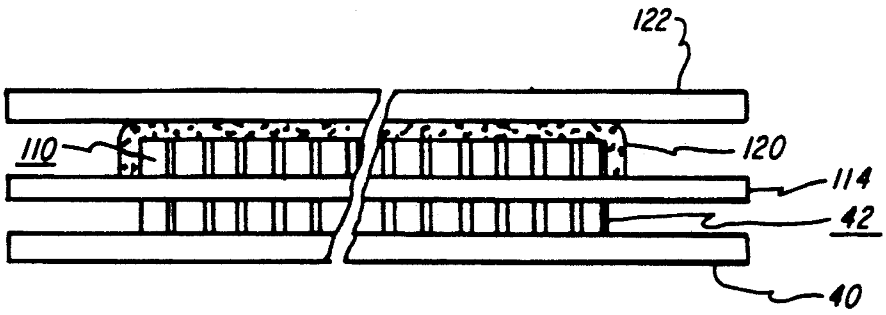
FIG. 12 illustrates a side view of the various components involved in a fifth embodiment of the method of making tile designs for mounting on a transparent or opaque substrate in accordance with the invention.

The temporary substrate 112 can, for example, be screening or paper which is secured to the front faces of the tile pieces 20-29 by a water soluble glue, or some other readily removable adhesive. As illustrated in FIG. 12, where the plastic film or screening, or sheet of plastic, 114 is used, the temporary substrate 120 can be created by spraying the tile design 110 with a commercially available form-type substrate such as Foam King, which will create a mold-type cavity about each of the tile pieces 20-29, but will not securely bond to the tile pieces.

The thin film of plastic or screening, or thin sheet of plastic 114 is now removed or can be kept in place during storage and transportation and removed just prior to permanent mounting. Once the thin film of plastic or screening or sheet of plastic 114 is removed, the back side of the tile design 110 is exposed. An adhesive such as General Electric Silicone 1200 is now placed on the back side of each of the tile pieces 20-29.

Figure 11:
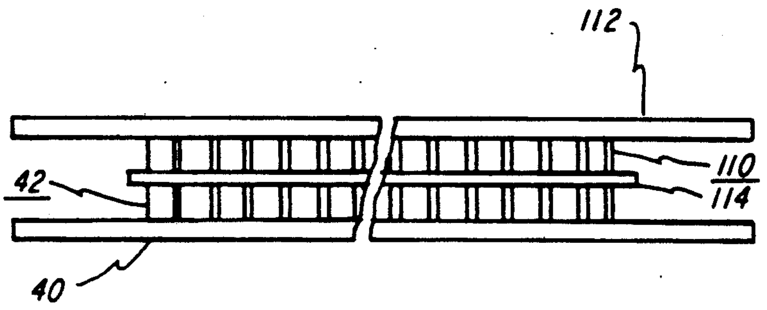
FIG. 11 illustrates a side view of the various components involved in a fourth embodiment of the method of making tile designs for mounting on a transparent or opaque substrate in accordance with the invention.

For permanent mounting, the tile design 110 of FIGS. 11 and 12 is positioned in place with the back side of the tile pieces 20-29 and adhesive thereon, urging against the permanent substrate until the adhesive sets, and then the temporary substrate 112 (FIG. 11) or 120 (FIG. 12) is removed. In the case of the paper or screening-type temporary substrate 112, a water soluble glue can be used and the temporary substrate removed by water. In the case of the foam-type substrate 122, the foam substrate can simply be pried off. If care is used in removing the foam substrate 120, the foam substrate 122 can be used as a mold for creating additional tile designs. This is particularly so if a support 122 is added to the foam substrate 120, as illustrated in FIG. 12, to build up its strength. The added support 122 can be accomplished by including a layer of screening and foam on top of the original foam substrate 120, or by gluing on an additional sheet of substrate. In such case, the added rigidity assures that the foam substrate 120 can have the strength to remain intact when removed and can thereafter be used as a mold pattern for creating future designs. Further, to reduce the likelihood that the tile pieces 20-29 will stick to the foam substrate 120 during the initial creation of the foam substrate, a piece of thin plastic film, such as available at most grocery stores for home wrapping of food, could be placed on the back face and possibly along part of the tile side of each tile piece 20-29 prior to applying the foam initially. In such case the foam will more likely stick to the plastic and, thereafter, if the foam substrate 120 is to continue to be used as a mold, there is no further need for the plastic film since once the foam is hardened the film will stay in place. Alternately the faces of the tile pieces 20-29 could be sprayed with an oily-type film prior to spraying with the foaming material to assure the tile pieces do not stick to the foam.

The foam substrate 114 of FIG. 12 has the added advantage in that it forms a mold for creating future tile designs without the necessity of repeating all the steps over, or without reusing the tile design pattern 42. All that needs to be done is to drop the corresponding tile pieces 20-29 front face down into the appropriate cavities in the foam substrate 120, adhesive glue applied to back face of the tile pieces, and then mounted to the permanent substrate as previously mentioned.

Figure 13:
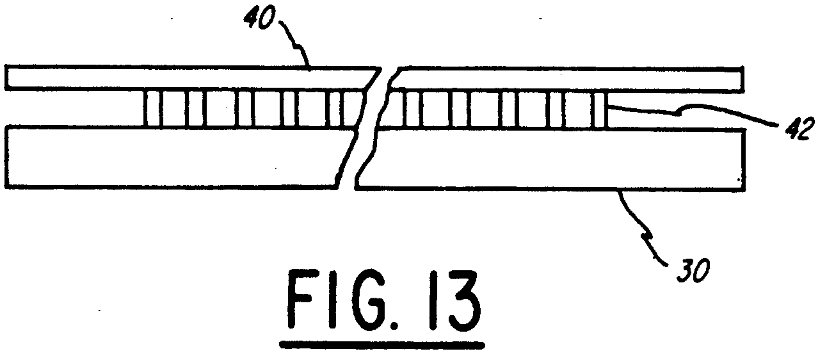
FIG. 13 illustrates a side view of the various components of the method of making tile designs for mounting on a transparent or opaque substrate in accordance with the invention.
Figure 15:
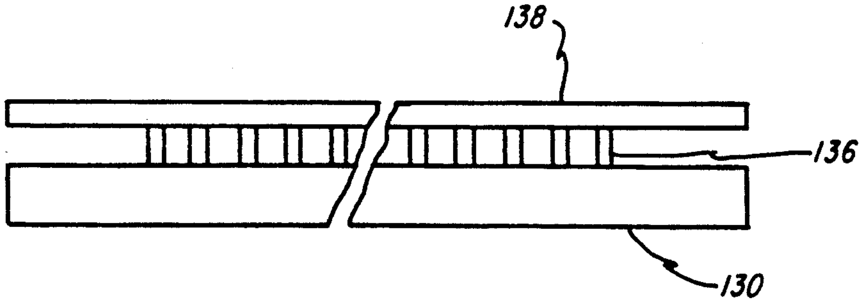
FIG. 15 illustrates a side view of the final step of the method of the sixth embodiment for mounting the tile design on the production substrate.
Figure 14:
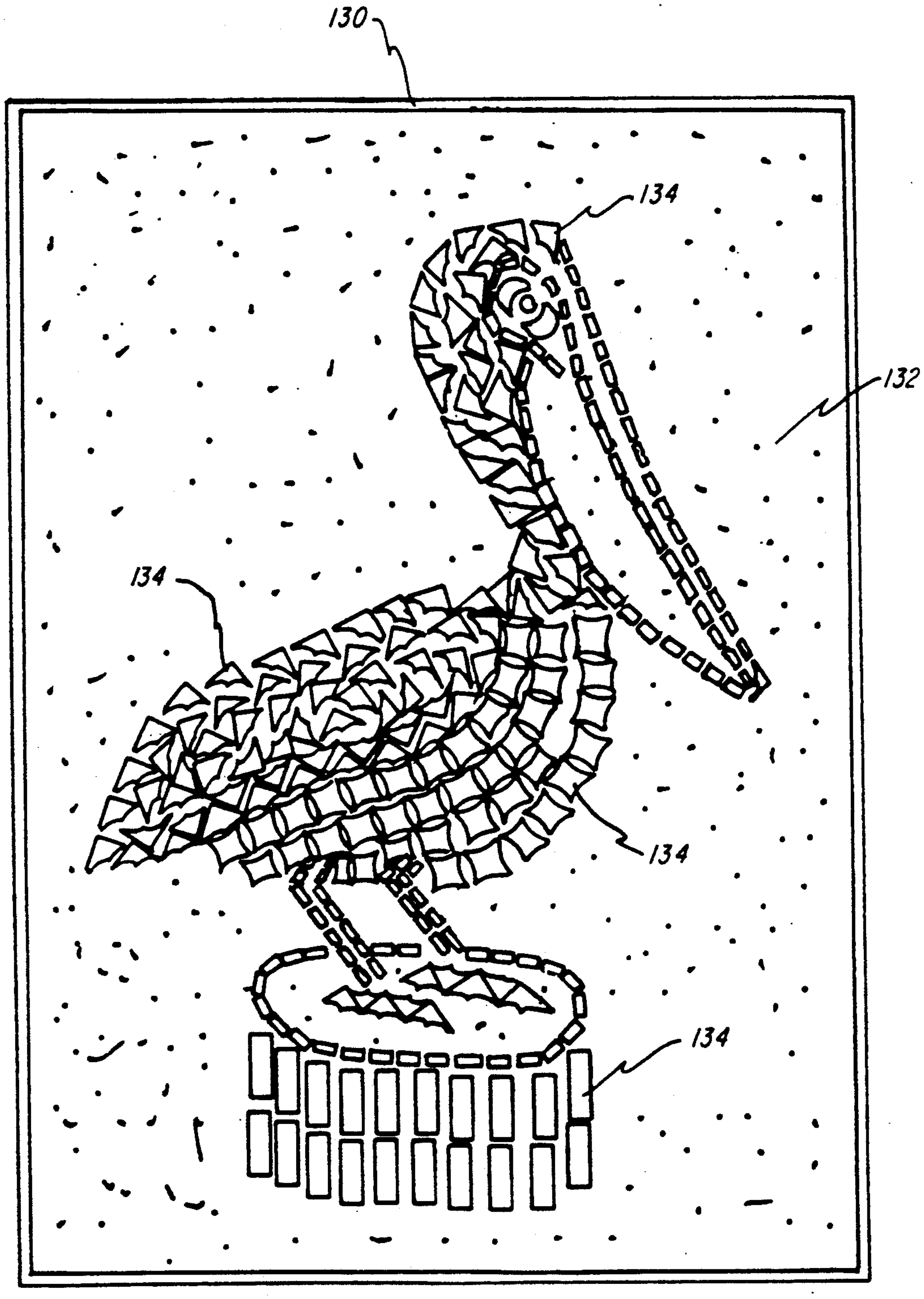
FIG. 14 is a top view of part of the components of FIG. 13 illustrating the cavities molded in the foam material.

In accordance with another embodiment of a method of making production tile designs as illustrated in FIGS. 13 and 15 whenin a pan 130 having a size larger than the tile design to be produced is filled with mold-forming substrate 132, such as foam. The tile design pattern 42 is now placed face down into the foam and kept in place until the foam sets. To reduce the adhesion between the tile design pattern 42 and the foam 132, the tile design pattern can be sprayed with an oily-type coating. Once the foam has hardened the tile design pattern 42 can be removed. This will provide a cavity-type mold 134 for each of the tile pieces in the foam 132 as illustrated in FIG. 14.

For the subsequent manufacture of production tile designs, the tile pieces 20-29 need merely be dropped into the appropriate cavities 134 in the foam 132 face down, and the production tile design 136 will be recreated. As illustrated in FIG. 15, an adhesive is now placed on the back side of each of the tile pieces 20-29, and the production substrate 138, transparent, semitransparent, translucent or opaque is now placed on the tile pieces 20-29 and maintained in place until the bond is complete. As mentioned above, the substrate 138 may be preformed with a plurality of holes to allow the adhesive to spread to the back of the substrate and provide the button-type bond. When the adhesive sets, the substrate 138 is removed from the foam mold 132 along with the tile pieces 20–29, and the foam mold can be used to create a subsequent production tile design.

As can be seen, the tile designs of the invention can be produced by mass production techniques. Once an initial tile design pattern 42 is created, the tile design can be readily reproduced with no need for additional creative techniques. A non-skilled worker can merely reproduce the production tile designs 62, 64, 110 and 136 according to instructions. This has the advantage of allowing the tile designs to be created in a factory and not individually created at the site at which they are to be installed.

By producing the tile designs on a transparent substrate, the tile designs can be mounted on any surface or wall, and since the substrate is transparent, the tile designs of the invention give the effect of being created directly on the background. Hence, there is no need to create the tile design of the invention in square or rectangular shapes. The tile design of the invention can be of any shape. The tile design can be artistic in the form of animals, birds, flowers, etc., or more conventionally shaped to form numbers and names. In addition, the tile designs on the transparent substrate are portable in that once mounted by several screws to the surface, can readily be moved and removed to another location as desired.

By using commercially available individual tile pieces, the need for the expensive and time consuming process of creating special designed tile pieces is eliminated. Further, there is no need to cut tile pieces to shape. Tile pieces need only be selected from pre-existing tile design units for their desired color and shape. Furthermore, although only a few pieces of tile from each commercially available tile design unit may be selected for any particular tile design, the other tile pieces can be stored and used to create other tile designs, thereby minimizing waste and reducing expenses. Furthermore, these commercially available tile pieces are created by a very sophisticated and expensive manufacturing technique that creates a wide variety of colors and shapes of tile pieces, even differing shades and colors within a single tile piece. In addition, such commercially produced tile pieces can be used to create ceramic-type tile designs which essentially are impervious to the elements of weather and the color will not fade, thereby allowing the tile designs to be used outdoors as well as indoors.

When the tile designs are to be used predominately outdoors, the tile designs can be secured to a Lexan substrate. The Lexan material has been developed as a very tough, durable, and highly flexible weather resistant plastic, often recommended for use in situations requiring a bulletproof window. Lexan has the advantage that it can be readily screw-mounted without cracking, nor will it become brittle with time, making such substrate ideal for outdoor use. However, if the tile design is to be used indoors a less expensive substrate can be used, particularly if the substrate is to be framed.

The tile design of the invention has been found to be particularly useful where tile designs are desired in areas subject to a lot of water, such as chlorinated water in hot tubs. Most hot tubs are built with a wooden decorative exterior. If tile units are to be mounted directly on the wood by standard cement or groat methods, great care must be taken so that the cement or grout does not extend beyond the tile since the wood will soak in the cement or grout thereby becoming stained or discolored. As a result, the standard method of applying tile units has jot been accepted. On the other hand, since the tile design of several embodiments of the invention are mass produced on a substrate, the tile design need merely be attached to the wooden exterior by screws. Although the tile designs in the specification have been described in the form of a pelican, it should be understood that the tile designs can take on any form, descriptive of an object or totally abstract. In the case of use with hot tubs, the tile designs can be produced in strips of any length and width, such as two feet by six inches and can have an abstract tile design covering the entire clear substrate, and mounted on the wooden exterior of the hot tub to provide a tile effect such as that provided for swimming pools. Since ceramic tiles have long been used with swimming pools and Lexan, the silicone adhesive, as a practical matter, will not be detrimentally effected by water, even chlorinated water, the tile design of the invention can be uniquely used with hot tubs. The button-type effect of the flexible adhesive provides the added strength for mounting, taking into consideration that the tile may be bumped when persons enter and leave the hot tub. In addition, the tie design can be readily removed for cleaning and repair, if necessary.

As mentioned above, the sheet substrate upon which the tile design is secured can be transparent or translucent, clear or colored, smooth or rough, and in accordance with one embodiment, non-transparent. However, the substrate may be flexible, but it should have sufficient rigidity so that it substantially maintains its shape while being handled. The tile design can be single-sided and be mounted on an exterior wall or fence, or can be mounted indoors. The single-sided design can be framed to form a picture and, in addition, can, if transparent or translucent, have a colored backing that is plain or with a design to further enhance the tile design. It should be noted that with the tile design on one side of the substrate and the background design on the reverse side of the substrate, an unusual third dimension effect is provided by the separation of the substrate. In addition, if double-sided, the tile design can be used as a room divider or can be placed in a window to provide an artistic effect from both sides.

By the use of a silicone-type adhesive, the mounting between the tile pieces and the substrate is flexible. This has the advantage of allowing the substrate to be readily handled and minimize the stress due to flex between the tile pieces and the substrate. Furthermore the flexibility of the adhesive minimizes stress due to differences between the coefficient of expansion of the substrate and the tile pieces. In addition, by using the hole-mounting procedure the strength of the bond between the tile pieces and the substrate can be greatly increased without impacting its flexibility.

Further, in accordance with an embodiment of the invention, the tile design is provided with the front face of the tile design temporarily secured to a substrate. This allows the tile design to be produced on a mass production basis and yet be installed on a non-transparent substrate. The mounting to the non-transparent substrate can be accomplished at the production facility or at the site by applying the adhesive and urging the design against the final substrate and later removing the temporary substrate once the adhesive has sufficiently dried.

Hence, as can be seen, unique tile design of the invention can be mass produced with the use of relatively inexpensive individual tile pieces, and yet achieve all the ruggedness and beauty available with the commercially available tile pieces produced by expensive manufacturing processes. The unique tile designs can be mass produced for mounting on transparent, translucent and non-transparent substrates. The unique tile designs can be readily mounted for use outdoors or indoors without any significant degradation to the tile design. According to the embodiments of the invention, the tile design is portable in that it can be mounted, and the, if desired, dismounted and mounted at subsequent location, providing the advantage of both a fixed artistic tile work as well as a portable one.

What is claimed is:

1. A tile design comprising:

a planar shaped transparent or translucent substrate, said substrate being sufficiently flexible to be readily handled yet sufficiently rigid to maintain its planar shape; and a plurality of various shaped and colored tile pieces primarily selected from commercially available precut tile pieces, secured on the sides abutting to said substrate to form an irregular shaped tile design thereon whereby the substrate provides the permanent support to maintain the shape of the tile design.

2. A tile design as set forth in claim 1 wherein said tile pieces are secured to said substrate with a flexible adhesive.

3. A tile design as set forth in claim 1 wherein said substrate includes a plurality of holes formed therein only at locations on said substrate where tile pieces are to be secured by an adhesive, and wherein at least one hole is located for each of said tile pieces so that said adhesive extends through the hole and along the reverse side of the substrate.

4. A tile design as set forth in claim 1 including a second plurality of tile pieces secured to the side of side substrate opposite to which said other tile design is secured to provide a double sided tile design.

5. A tile design as set forth in claim 4 wherein said tile designs on both sides of said substrate are mirror images.

* * * * *